Figures 1, 2, 3, 4:
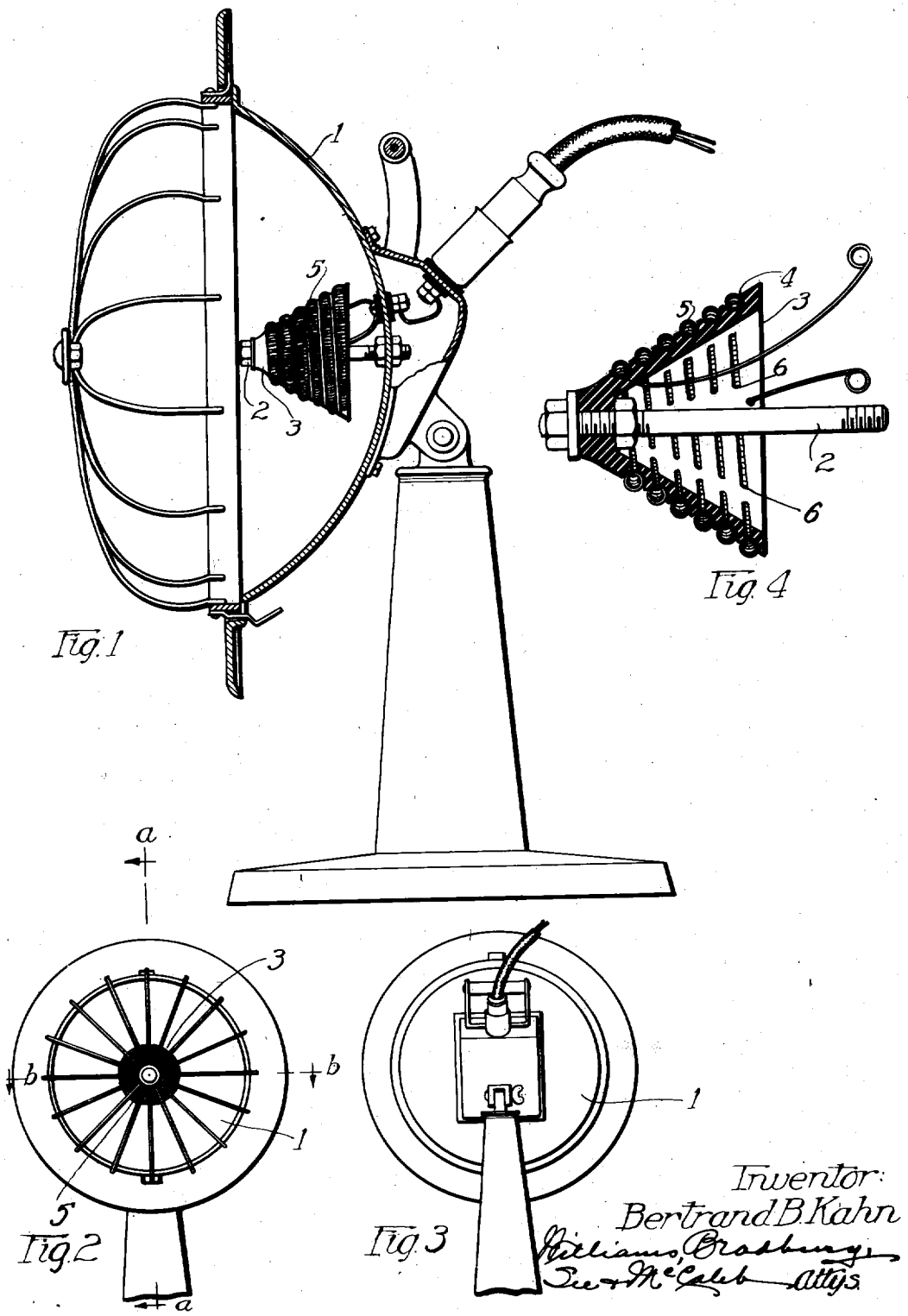

B. B. KAHN.

ELECTRIC HEATER.

APPLICATION FILED JUNE 21, 1920.

Reissued Apr. 12, 1921. 15,085.

Inventor:
Bertrand B. Kahn
Williams, Bradbury,
McCaleb & Hinkle
Attys.

UNITED STATES PATENT OFFICE.

BERTRAND B. KAHN, OF CINCINNATI, OHIO, ASSIGNOR TO THE ESTATE STOVE COMPANY, OF HAMILTON, OHIO.

ELECTRIC HEATER.

15,085. Specification of Reissued Letters Patent. Reissued Apr. 12, 1921.

Original No. 1,304,687, dated May 27, 1919, Serial No. 246,663, filed July 25, 1918. Application for reissue filed June 21, 1920. Serial No. 390,645.

*To all whom it may concern:*

Be it known that I, BERTRAND B. KAHN, a citizen of the United States, residing at Cincinnati, Hamilton county, Ohio, have invented certain new and useful Improvements in Electric Heaters, of which the following is a specification.

This invention, pertaining to electric heaters of the radiator reflector class, relates to the form and construction of the radiator and will be readily understood from the following description taken in connection with the accompanying drawing, in which:—

Figure 1 is a side elevation, part vertical section, of a reflecting radiator embodying my invention, the section appearing in the plane of line *a* of Figs. 2 and 3;

Fig. 2 a front elevation of the same;

Fig. 3 a rear elevation of the same; and

Fig. 4 a horizontal section of the radiator in the plane of line *b* of Figs. 1, 2 and 3.

A diversity of scale is employed in the drawing.

In the drawing:—

1, indicates a concave reflector;

2, a stud having its rear end anchored into the center of the back of the reflector;

3, a hollow frusto-conical insulator secured to the forward end of the stud, the open rear portion of the insulator being spaced forward from the reflector, this insulator being formed of refractory insulating material;

4, a groove extending helically around the exterior of the insulator;

5, a resistance wire, conveniently but not necessarily coiled, this wire being laid in the groove and having its terminal ends projecting through the wall of the insulator and rearward to suitable binding-posts adapted to have connected with them the conductors for bringing current to the heater; and 6, ports leading to the interior of the insulator from the base of the helical groove therein.

Upon a passage of current through the resistance wire it becomes heated and luminous and rays of heat are projected forwardly directly therefrom. At the same time rays from the wire strike the concave surface of the reflector and are reflected forwardly therefrom. Rays of heat from the wire are projected into the interior of the insulator through the ports 6 and reach the surface of the reflector and are projected forward, the consequence being that a fairly concentrated beam of heat is projected forward from the apparatus.

The circumferential ridges between the grooves 4 serve in separating the windings of the coil resistance wire and preventing portions of it from becoming short-circuited. The groove is less in depth than the diameter of the wire-coil, and the taper of the cone is such that one convolution of the wire-coil will appear as greater in diameter than the wire-coil immediately in front of it. The result is that when the cone is viewed from the front and the wire is luminous, the appearance is that of a complete luminous rosette, except at the center of the cone.

While it is a fact that I am not the first to construct a heating apparatus comprising a concave reflector in combination with a luminous electric heating element disposed at the center, or approximate center, of the reflector, I do believe that it is new with me to employ in such a combination a luminous electric heating element conformed to provide a conical helix which is held in the reflector with the small end of the conical helix presented forwardly, so that when the heating element is viewed from the front, each convolution thereof, except the first, appears to be a portion of greater diameter than the convolution immediately to the front thereof, the result of this arrangement being that when the resistance element is heated to luminosity, the convolutions of the heating element are not individually distinguishable, the heating element appearing to the eye as a single luminous and radiant rosette. This is an effect which, so far as I am aware, has never before been obtained, and is directly attributable to the arrangement just described. The herein described conformation and disposition of the heating element whereby I obtain the luminous rosette effect, and also the combination of this heating element with the form of heating element support herein shown and described, are considered by me to be salient and patentable features of my invention.

I claim:—

1. An electric heater comprising, a concave reflector, a frusto-conical insulator fixed at the center of the reflector and presenting its smaller end forwardly and provided on its periphery with a helical groove with a low separating land, and a helical coil of resistance wire coiled in such groove, the helical coil having a diameter greater than that of the groove in which it is seated, combined substantially as set forth.

2. A combination such as defined in claim 1, in combination with a supporting stud projecting from the larger end of the insulator, substantially as set forth.

3. A combination such as defined in claim 1, when the insulator is hollow and its back open, substantially as set forth.

4. A combination such as defined in claim 3, when the insulator is provided with ports extending through its wall at the bottom of the groove, substantially as set forth.

5. A combination such as defined in claim 2 when the rear end of the stud is anchored in the center of the reflector, substantially as set forth.

6. A combination such as defined in claim 5 when the larger end of the insulator is spaced away from the reflector, substantially as set forth.

7. An electric heater of the class described comprising a concave reflector, a heating element comprising resistance material having the form of a conical helix, said heating element being supported in the reflector with the central axis of the conical helix alined with the focal axis of the reflector, and the small end of the conical helix presented forwardly, each convolution of the heating element, except the first, being disposed a distance from the central axis of the conical helix that is substantially greater than the distance between said axis and the convolution immediately in front thereof, whereby the heating element, when heated to luminosity, presents the appearance of a single luminous rosette.

8. An electric heater comprising in combination with a concave reflector, a heating element carrier of insulating material and of substantially conical form supported, with its small end presented forwardly, at substantially the center of the reflector, a radiant heating element consisting of resistance material having the form of a conical helix and fitted around said carrier, each of the convolutions of said heating element, except the first, being disposed a distance from the axis of the cone that is substantially greater than the distance between said axis and the convolution immediately in front thereof, whereby the heating element when heated to luminosity presents the appearance of a single luminous rosette.

9. An electric heater comprising in combination with a concave reflector, a heating element carrier of insulating material and conical form supported, with its small end presented forwardly at substantially the center of the reflector, a spiral groove formed in the outer tapering surface of said carrier, together with resistance material turned around said carrier and fitting said groove, each of the convolutions of said heating element, except the first, being disposed a distance from the axis of the cone that is substantially greater than the distance between said axis and the convolution immediately in front thereof, whereby the several convolutions of the resistance material, when heated to luminosity, present the appearance of a single luminous rosette.

10. An electric heater comprising in combination with a concave reflector, a heating element carrier of insulating material and of hollow conical form supported, with its small end presented forwardly, at substantially the center of the reflector, the rear or larger end of said conical carrier being open, a radiant heating element consisting of resistance material having the form of a conical helix wrapped around said carrier, so that when viewed from the front, each convolution of the resistance material, except the first, appears to be of greater diameter than the convolution in front thereof, there being apertures in the tapering wall of said hollow carrier whereby heat from the inner side of the resistance material is thrown into the hollow carrier and backwardly against the reflector.

11. In an electric heater, the combination with a concave reflector, a substantially conical heating element carrier of insulating material disposed at the center of said reflector with the smaller end of the carrier presented forwardly, a resistance element carried by said carrier, a stud projecting from the larger end of said carrier and anchored in the center of said reflector, said stud constituting the sole means for supporting the carrier and heating element from and in the reflector.

12. In an electric heater, the combination with a concave reflector, a heating element support of insulating material and conical form disposed in said reflector at substantially the center thereof with the smaller end of the carrier projecting forwardly, resistance material wound around said support and carried thereby, said conical support being hollow and open at its larger end, a stud having one end anchored in the smaller end of the support and extending rearwardly through the open larger end of the support, the other end of said stud being anchored in the reflector at the center thereof, said stud serving as the sole means for supporting said heating element and its support from and in the reflector.

In witness whereof, I hereunto subscribe my name this 14 day of June, 1920.

BERTRAND B. KAHN.

Witnesses:
R. R. Asbury,
Dora Tiemeyer.